UNITED STATES PATENT OFFICE.

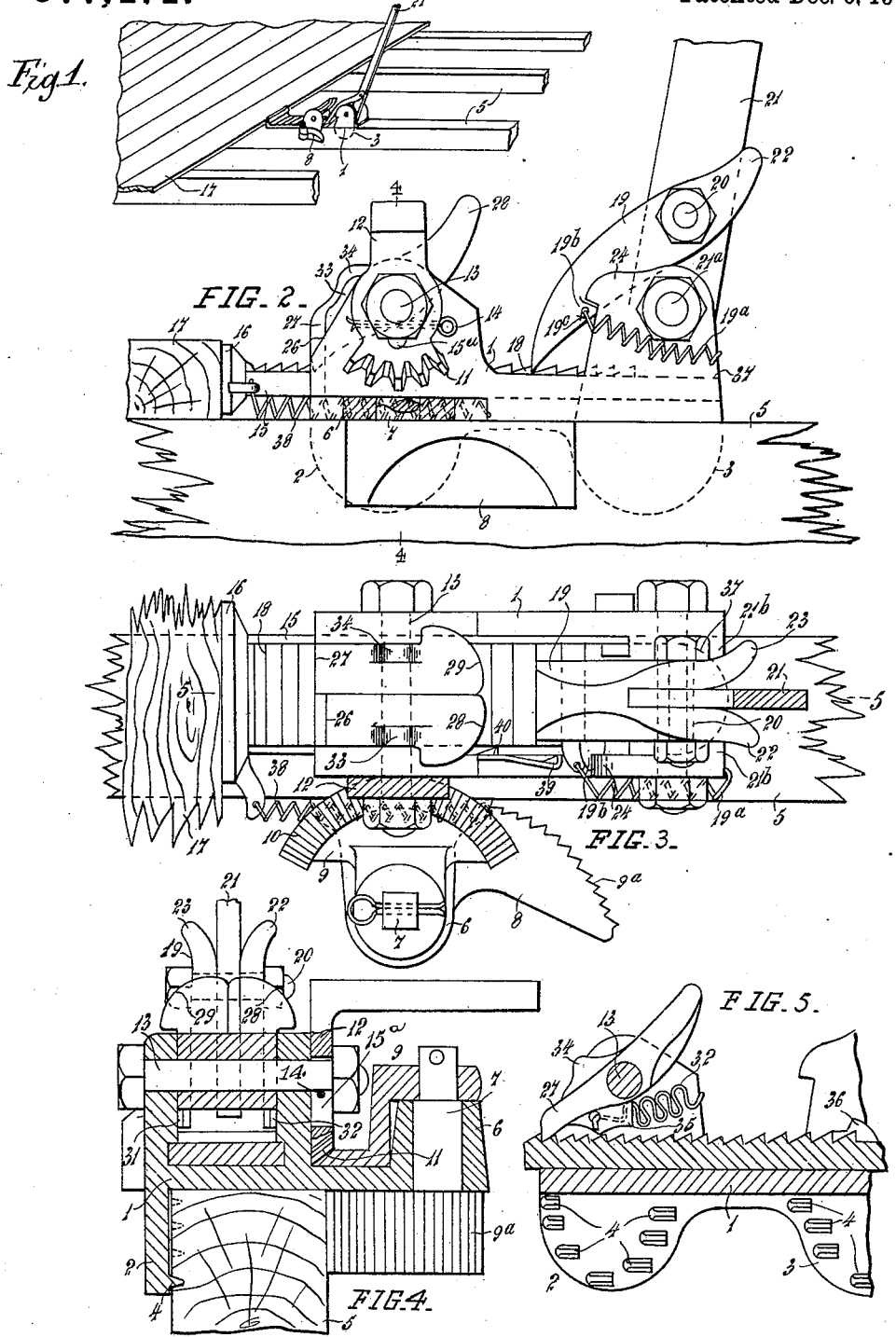

PERCY PICKERING, OF WELLINGTON, NEW ZEALAND.

FLOORING-CRAMP.

977,471.  Specification of Letters Patent.  Patented Dec. 6, 1910.

Application filed April 12, 1909. Serial No. 489,442.

*To all whom it may concern:*

Be it known that I, PERCY PICKERING, a subject of His Majesty the King of Great Britain and Ireland, residing at Panama street, Wellington, in the Provincial District of Wellington, in the Dominion of New Zealand, have invented certain new and useful Improvements in Flooring-Cramps, of which the following is a specification.

The invention relates to that class of apparatus used for cramping together boards before they are nailed upon joints or studs.

The invention provides an exceedingly simple and efficient apparatus for this purpose and combines several improvements which are capable of independent use in connection with other kinds of cramps.

According to the invention, a plunger having rack teeth slides in a frame and is projected forward therein by a pawl pivoted upon a hand lever. A pair of retaining pawls hold the rack in position, the pawls being arranged so that one or other of them is always in engagement with the teeth of the rack. The frame is clamped upon the joist by a toothed cam upon one side of the apparatus and a roughened cheek plate upon the other side, the toothed cam being operated by a lever which forces it against the joist.

I will now describe the details of the invention by the aid of the accompanying drawing wherein:—

Figure 1, is a side perspective elevation showing the cramp in position, Fig. 2, a side elevation partly in section, Fig. 3, a plan, Fig. 4, an end sectional elevation on line 4—4 Fig. 2, and Fig. 5, a side sectional elevation on line 5—5, Fig. 3.

The frame 1 has the cheeks 2 and 3 which have projecting teeth 4 adapted to engage in the side of the joist 5. A bracket 6 forms a bearing for a vertical spindle 7 integrally formed with the curved cam 8 which has a serrated edge $9^a$ adapted to engage with the flooring joist. Upon the spindle 7 is fixed a quadrant 9 having teeth 10 engaged by suitably formed teeth 11 upon the end of a lever 12, which is pivoted upon a bolt 13, and may be operated to actuate the cam through the medium of the quadrant 9.

The cam is particularly designed to take a wide range of sizes of joists. For extremely wide joists a pin 14, which passes across the lever 12 below the bolt 13, may be withdrawn, and the lever raised, a slot $15^a$ enabling this to be effected, so that the teeth 11 clear the teeth 10 of the quadrant. The quadrant may then be turned around until the cam 8 is in suitable position and the lever then pushed down until its teeth reengage the quadrant; the pin is then replaced.

The plunger 15 has the head 16 engaging with the board 17 and slides in a channel formed for its reception in the frame 1. The ratchet teeth 18 upon the plunger are engaged one after the other by a pawl 19 pivoted by a bolt 20 upon the main operating lever 21. Lever 21 is pivoted by a bolt $21^a$ in the frame 1. The frame has bosses $21^b$ integrally formed upon each side, and the hand lever fits between them. By this means the necessity of forging a boss upon the lever is obviated. The pawl 19 is weighted so that it normally falls into engagement with the teeth, and if desired a spring $19^a$ may be used to facilitate its operation. Upon the rear of the pawl are the ears 22 and 23, one or other of which may be pressed upon by the foot of the workman when it is desired to disengage the pawl from the teeth. Shoulders 24 projecting from the frame are engaged by the head and nut respectively of the bolt 20 and limit the vibration of the lever in a forward direction.

The retaining pawls 26 and 27 are pivoted upon the bolt 13, the pawl 27 projecting slightly in advance of the pawl 26, one pawl only being in engagement with the teeth of the plunger while a comparatively small movement of the plunger causes the other pawl to engage. The pawls have each a tail piece 28 and 29 respectively, which tail pieces may be pressed by the foot of the workman when it is desired to disengage the pawls from the teeth. The pawls are operated upon by springs 31 and 32 respectively. These springs are preferably made of steel wire, bent into the form clearly shown in Fig. 5, one end of the spring being connected to the frame while the other end is connected to the pawl. Shoulders 33 and 34 respectively upon the pawls 26 and 27 may be pressed upon by the foot of the workman to facilitate the engagement of the pawls in the rack. The pawl 27 has a downward projection 35 which is engaged by a stop 36 integrally formed upon the end of the plunger. The plunger has an extension 37 having a smooth surface upon which the pawl 19 rides when the plunger is at the end of its stroke. To retain the plunger at the inward end of the stroke when the apparatus is moved from place to place, I employ a spring 38 secured to the side of the frame and a projection in the head of the plunger. The frame also is provided with a spring or yielding detent 39 which engages in a corresponding recess 40 formed in the side of the plunger. The spring 38 is strong enough to retain the plunger but yields when the plunger is moved forward by the pawl. The teeth 18 are wider apart toward the rear end of the plunger in order to obtain increased strength where the greatest strain and wear occurs.

In operation the pawls are raised and the plunger pushed back to its inward limit. The frame is then placed upon the top of the joist and the lever 12 operated, which may be done by the foot of the workman, so that the cam 8 is operated and the joist clamped between it and the cheeks 2, the teeth upon which are forced into the joist. The hand lever 21 is then vibrated and the boards forced together by the plunger 15. When sufficiently cramped the boards are nailed and the apparatus removed by raising the pawls.

What I do claim and desire to secure by Letters Patent of the United States is:—

1. In apparatus for the purpose indicated, means for clamping the apparatus upon a joist comprising in combination a curved cam having serrations upon its edge and a vertically projecting spindle, a toothed quadrant upon said spindle and a pivoted lever having teeth adapted to engage with the teeth of said quadrant, cheeks downwardly projecting from the frame, and teeth upon the face of said cheeks, substantially as specified herein and illustrated.

2. In an apparatus for the purpose described, the combination of a frame adapted to rest upon a joist and having means depending therefrom to engage a side face of the joist, a clamping segment arranged below a section of said frame that projects beyond the opposite face of the joist and having an upwardly extending spindle extending through a bearing on the frame, a gear connected with said spindle and extending over a portion of the frame, a lever fulcrumed on the frame and engaging said gear, a plunger mounted in the frame and movable therein longitudinally of the joist, and a second lever fulcrumed on the frame and adapted to actuate the plunger.

3. In an apparatus for the purpose described, the combination of a frame adapted to rest upon a joist and having at one edge a depending cheek to engage a side face of the joist and having a horizontal projection extending beyond the opposite face of the joist, a vertical spindle extending through a bearing on said horizontal projection, a segment connected with the lower end of the spindle and movable thereby to and from engagement with the joist, a gear connected with the spindle and extending between the said bearing and the body of the frame, a lever fulcrumed on the frame to turn about a horizontal axis and having its lower end engaging said gear, the upper arm of said lever being bent laterally away from the frame, a plunger mounted in the frame and movable beyond an end thereof in the direction of the length of the joist, and a lever fulcrumed on the frame and adapted to actuate the plunger.

4. In an apparatus for the purpose indicated, the combination of a frame adapted to rest upon a joist and engage a vertical face thereof, a clamping segment mounted on a vertical spindle carried by the frame and adapted to engage the other vertical face of the joist, a lever fulcrumed on a horizontal axis on the frame and having its lower end engaging said segment and its upper end bent laterally in position to be readily moved by an operator's foot, a plunger mounted in the frame, and a hand lever adapted to move the plunger outwardly.

In testimony whereof I have signed my name to this specification in the presence of two witnesses.

PERCY PICKERING.

Witnesses:
 ERNEST SMITH BALDWIN,
 JOHN JOSEPH WATSON.